United States Patent
Schneider et al.

(10) Patent No.: US 8,272,667 B2
(45) Date of Patent: Sep. 25, 2012

(54) LOW-MOUNT INFLATABLE KNEE AIRBAGS HAVING SERIAL CHAMBERS

(75) Inventors: David W. Schneider, Waterford, MI (US); Michael Joseph Lachat, Shelby Township, MI (US); ChangSoo Choi, Rochester, MI (US); Christina R. Morris, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 308 days.

(21) Appl. No.: 12/611,676

(22) Filed: Nov. 3, 2009

(65) Prior Publication Data

US 2011/0101660 A1 May 5, 2011

(51) Int. Cl.
*B60R 21/205* (2006.01)
*B60R 21/231* (2006.01)
*B60R 21/233* (2006.01)

(52) U.S. Cl. ............... 280/730.1; 280/729; 280/728.2
(58) Field of Classification Search ............ 280/730.1, 280/729, 728.2
See application file for complete search history.

(56) References Cited

U.S. PATENT DOCUMENTS

| | | |
|---|---|---|
| 3,858,822 A | 1/1975 | Wood |
| 3,904,222 A | 9/1975 | Bursott et al. |
| 3,966,227 A | 6/1976 | Cameron |
| 4,290,627 A | 9/1981 | Cumming et al. |
| 5,338,061 A | 8/1994 | Nelson et al. |
| 5,344,184 A | 9/1994 | Keeler et al. |
| 5,427,410 A | 6/1995 | Shiota et al. |
| 5,460,400 A | 10/1995 | Davidson |
| 5,529,337 A | 6/1996 | Takeda et al. |
| 5,669,627 A | 9/1997 | Marjanski et al. |
| 5,690,354 A | 11/1997 | Logan et al. |
| 5,765,867 A | 6/1998 | French |
| 5,772,239 A | 6/1998 | Seymour |
| 5,803,487 A | 9/1998 | Kikuchi et al. |
| 5,810,390 A | 9/1998 | Enders et al. |
| 5,823,566 A | 10/1998 | Manire |
| 5,845,935 A | 12/1998 | Enders et al. |
| 5,927,748 A | 7/1999 | O'Driscoll |
| 6,010,147 A | 1/2000 | Brown |
| 6,059,312 A | 5/2000 | Staub et al. |
| 6,135,495 A | 10/2000 | Redgrave et al. |
| 6,155,595 A | 12/2000 | Schultz |

(Continued)

FOREIGN PATENT DOCUMENTS

DE 20 2006 014 012 8/2006
(Continued)

OTHER PUBLICATIONS

Amendment and Response to Office Action filed Jun. 30, 2011 in co-pending U.S. Appl. No. 12/430,562, now published as U.S. Publication No. US 2010/0270775.

(Continued)

*Primary Examiner* — Ruth Ilan
(74) *Attorney, Agent, or Firm* — Sally J. Brown; Stoel Rives LLP.

(57) ABSTRACT

An inflatable knee airbag can have a plurality of inflatable chambers. The inflatable chambers can be formed as independent chambers, rather than a single chamber being divided by an internal tether. The inflatable chambers can be arranged in a serial configuration, wherein the chambers form an "L" shape so that when the airbag is deployed, it conforms to the shape of an instrument panel.

14 Claims, 9 Drawing Sheets

U.S. PATENT DOCUMENTS

| | | | |
|---|---|---|---|
| 6,213,496 B1 | 4/2001 | Minami et al. | |
| 6,217,059 B1 | 4/2001 | Brown et al. | |
| 6,224,129 B1 | 5/2001 | Cisternino et al. | |
| 6,254,121 B1 | 7/2001 | Fowler et al. | |
| 6,299,205 B1 | 10/2001 | Keshavaraj | |
| 6,364,348 B1 | 4/2002 | Jang et al. | |
| 6,431,583 B1 | 8/2002 | Schneider | |
| 6,454,296 B1 | 9/2002 | Tesch et al. | |
| 6,464,255 B1 | 10/2002 | Preisler et al. | |
| 6,474,686 B1 | 11/2002 | Higuchi et al. | |
| 6,494,484 B2 | 12/2002 | Bosgieter et al. | |
| 6,588,793 B2 | 7/2003 | Rose | |
| 6,631,920 B1 | 10/2003 | Webber et al. | |
| 6,655,711 B1 | 12/2003 | Labrie et al. | |
| 6,682,093 B2 | 1/2004 | Tajima et al. | |
| 6,685,217 B2 | 2/2004 | Abe | |
| 6,715,789 B2 | 4/2004 | Takimoto et al. | |
| 6,752,417 B2 | 6/2004 | Takimoto et al. | |
| 6,846,005 B2 | 1/2005 | Ford et al. | |
| 6,913,280 B2 | 7/2005 | Dominissini et al. | |
| 6,945,557 B2 | 9/2005 | Takimoto et al. | |
| 6,959,944 B2 | 11/2005 | Mori et al. | |
| 6,962,363 B2 | 11/2005 | Wang et al. | |
| 6,962,366 B2 | 11/2005 | Fukuda et al. | |
| 7,000,945 B2 | 2/2006 | Bakhsh et al. | |
| 7,000,947 B2 | 2/2006 | Kumagai et al. | |
| 7,029,026 B2 | 4/2006 | Morita | |
| 7,055,851 B2 | 6/2006 | Takimoto et al. | |
| 7,131,664 B1 | 11/2006 | Pang et al. | |
| 7,147,247 B2 | 12/2006 | Hayakawa | |
| 7,156,418 B2 | 1/2007 | Sato et al. | |
| 7,175,195 B2 | 2/2007 | Morita | |
| 7,182,365 B2 | 2/2007 | Takimoto et al. | |
| 7,185,912 B2 | 3/2007 | Matsuura et al. | |
| 7,195,275 B2 | 3/2007 | Abe | |
| 7,195,280 B2 | 3/2007 | Wheelwright et al. | |
| 7,201,396 B2 | 4/2007 | Takimoto et al. | |
| 7,226,077 B2 | 6/2007 | Abe | |
| 7,232,149 B2 | 6/2007 | Hotta et al. | |
| 7,261,318 B2 | 8/2007 | Enders | |
| 7,281,734 B2 | 10/2007 | Abe et al. | |
| 7,314,228 B2 | 1/2008 | Ishiguro et al. | |
| 7,314,230 B2 | 1/2008 | Kumagai et al. | |
| 7,347,444 B2 | 3/2008 | Wheelwright | |
| 7,370,881 B2 | 5/2008 | Takimoto et al. | |
| 7,374,201 B2 | 5/2008 | Chausset | |
| 7,374,202 B2 | 5/2008 | Lim | |
| 7,380,813 B2 | 6/2008 | Lanzinger et al. | |
| 7,384,065 B2 | 6/2008 | Takimoto et al. | |
| 7,387,311 B2 | 6/2008 | Kanno et al. | |
| 7,396,044 B2 | 7/2008 | Bauer et al. | |
| 7,434,837 B2 | 10/2008 | Hotta et al. | |
| 7,438,310 B2 | 10/2008 | Takimoto et al. | |
| 7,549,672 B2 | 6/2009 | Sato et al. | |
| 7,566,074 B2 | 7/2009 | Hawthorn et al. | |
| 7,568,724 B2 | 8/2009 | Kutchey et al. | |
| 7,568,730 B2 | 8/2009 | Kwon | |
| 7,631,894 B2 | 12/2009 | Hasebe et al. | |
| 7,641,223 B2 | 1/2010 | Knowlden | |
| 7,658,408 B2 | 2/2010 | Zofchak et al. | |
| 7,658,409 B2 | 2/2010 | Ford et al. | |
| 7,695,013 B2 | 4/2010 | Kakstis et al. | |
| 7,712,769 B2 | 5/2010 | Hasebe et al. | |
| 7,717,460 B2 | 5/2010 | Franke et al. | |
| 7,744,118 B2 | 6/2010 | Takimoto et al. | |
| 7,748,739 B2 | 7/2010 | Brinker | |
| 7,753,405 B2 | 7/2010 | Ishiguro et al. | |
| 7,753,407 B2 | 7/2010 | Yokota | |
| 7,766,374 B2 | 8/2010 | Abele et al. | |
| 7,793,973 B2 | 9/2010 | Sato et al. | |
| 7,798,517 B2 | 9/2010 | Ishida | |
| 7,819,419 B2 | 10/2010 | Hayashi et al. | |
| 7,878,540 B2 | 2/2011 | Takimoto et al. | |
| 8,083,254 B2 | 12/2011 | Enders et al. | |
| 8,118,325 B2 | 2/2012 | Enders et al. | |
| 2001/0007391 A1 | 7/2001 | Hamada et al. | |
| 2002/0044819 A1 | 4/2002 | Shamoon | |
| 2002/0149187 A1 | 10/2002 | Holtz et al. | |
| 2002/0171231 A1 | 11/2002 | Takimoto et al. | |
| 2002/0180187 A1 | 12/2002 | Hayashi | |
| 2003/0034637 A1 | 2/2003 | Wang et al. | |
| 2003/0209888 A1 | 11/2003 | Davis, Jr. et al. | |
| 2005/0001412 A1 | 1/2005 | Schneider et al. | |
| 2005/0057028 A1 | 3/2005 | Hayakawa | |
| 2005/0062265 A1 | 3/2005 | Hotta et al. | |
| 2005/0151351 A1 | 7/2005 | Enders et al. | |
| 2005/0194767 A1 | 9/2005 | Freisler et al. | |
| 2005/0194771 A1 | 9/2005 | Clark et al. | |
| 2005/0212275 A1 | 9/2005 | Hasebe | |
| 2005/0230939 A1 | 10/2005 | Abe et al. | |
| 2006/0279073 A1 | 12/2006 | Hotta et al. | |
| 2007/0057487 A1 | 3/2007 | Kim | |
| 2007/0120346 A1 | 5/2007 | Kwon | |
| 2007/0200321 A1 | 8/2007 | Heitplatz et al. | |
| 2007/0246920 A1 | 10/2007 | Abele et al. | |
| 2007/0267852 A1* | 11/2007 | Enders .................... 280/730.1 |
| 2008/0157509 A1 | 7/2008 | Abe et al. | |
| 2008/0217892 A1 | 9/2008 | Maripudi et al. | |
| 2008/0238048 A1 | 10/2008 | Ishida | |
| 2009/0045607 A1 | 2/2009 | Fukuyama et al. | |
| 2009/0058048 A1 | 3/2009 | Ishida et al. | |
| 2009/0058052 A1 | 3/2009 | Ford et al. | |
| 2009/0085333 A1 | 4/2009 | Imaeda et al. | |
| 2009/0134611 A1 | 5/2009 | Wigger et al. | |
| 2009/0146400 A1 | 6/2009 | Knowlden | |
| 2009/0152842 A1 | 6/2009 | Benny et al. | |
| 2009/0152847 A1 | 6/2009 | Hong et al. | |
| 2009/0184498 A1 | 7/2009 | Takimoto et al. | |
| 2009/0212541 A1 | 8/2009 | Wallat et al. | |
| 2009/0242308 A1 | 10/2009 | Kitte et al. | |
| 2010/0025973 A1 | 2/2010 | Jang et al. | |
| 2010/0090445 A1 | 4/2010 | Williams et al. | |
| 2010/0270775 A1 | 10/2010 | Enders et al. | |
| 2010/0270779 A1 | 10/2010 | Enders et al. | |
| 2010/0270782 A1 | 10/2010 | Enders et al. | |
| 2011/0012327 A1 | 1/2011 | Enders | |
| 2011/0148077 A1 | 6/2011 | Enders | |
| 2012/0025496 A1 | 2/2012 | Schneider et al. | |
| 2012/0049488 A1 | 3/2012 | Enders | |
| 2012/0049497 A1 | 3/2012 | Enders | |

FOREIGN PATENT DOCUMENTS

| | | |
|---|---|---|
| DE | 10 2008 02981 | 12/2009 |
| WO | WO 02/04262 | 1/2002 |
| WO | WO 2010/126623 | 11/2010 |
| WO | WO-2011/008916 | 1/2011 |
| WO | WO-2011/056810 | 5/2011 |
| WO | WO-2011/079178 | 6/2011 |
| WO | WO-2012/030482 | 3/2012 |

OTHER PUBLICATIONS

Examiner's Interview Summary mailed Jul. 6, 2011 in co-pending U.S. Appl. No. 12/430,562, now published as U.S. Publication No. US 2010/0270775.

Notice of Allowance and Fee(s) Due mailed Aug. 23, 2011 in co-pending U.S. Appl. No. 12/430,562, now published as U.S. Publication No. US 2010/0270775.

Amendment and Response to Office Action filed Jul. 21, 2011 in co-pending U.S. Appl. No. 12/430,274, now published as U.S. Publication No. US 2010/0270779.

Amendment and Response to Office Action filed Apr. 28, 2011 in co-pending U.S. Appl. No. 12/430,246, now published as U.S. Publication No. US 2010/0270782.

Final Office Action mailed Jun. 24, 2011 in co-pending U.S. Appl. No. 12/430,246, now published as U.S. Publication No. US 2010/0270782.

Amendment and Response to Office Action filed Jun. 13, 2011 in co-pending U.S. Appl. No. 12/504,544, now published as U.S. Publication No. US 2011/0012327.

Final Office Action mailed Jun. 29, 2011 in co-pending U.S. Appl. No. 12/504,544, now published as U.S. Publication No. US 2011/0012327.

Examiner's Interview Summary mailed Jul. 7, 2011 in co-pending U.S. Appl. No. 12/504,544, now published as U.S. Publication No. US 2011/0012327.

Notice of Allowance and Fee(s) Due mailed Oct. 18, 2011 in co-pending U.S. Appl. No. 12/430,274, now published as U.S. Publication No. US 2010/0270779.
Amendment and Response After Final filed Aug. 29, 2011 in co-pending U.S. Appl. No. 12/504,544, now published as U.S. Publication No. US 2011/0012327.
Advisory Action mailed Sep. 9, 2011 in co-pending U.S. Appl. No. 12/504,544, now published as U.S. Publication No. US 2011/0012327.
Request for Continued Examination filed Oct. 6, 2011 in co-pending U.S. Appl. No. 12/504,544, now published as U.S. Publication No. US 2011/0012327.
Office Action mailed Dec. 1, 2011 in co-pending U.S. Appl. No. 12/504,544, now published as U.S. Publication No. US 2011/0012327.
Restriction Requirement mailed Oct. 27, 2011 in co-pending U.S. Appl. No. 12/872,946.
Amendment and Response to Requirement of Election of Species filed Nov. 28, 2011 in co-pending U.S. Appl. No. 12/872,946.
Office Action mailed Dec. 14, 2011 in co-pending U.S. Appl. No. 12/872,946.
Co-pending U.S. Appl. No. 13/270,462, titled Knee Airbag Assemblies and Related Methods, filed Oct. 11, 2011.
Co-pending U.S. Appl. No. 13/290,856, titled Knee Airbag Folding Patterns and Assemblies and Related Methods, filed Nov. 7, 2011.
Restriction Requirements mailed Jan. 20, 2012 in co-pending U.S. Appl. No. 12/645,130, now published as U.S. Publication No. US 2011/0148077.
Notification of Transmittal of the International Search Report and the Written Opinion of the International Searching Authority mailed Jan. 26, 2012 in International Application No. PCT/US2011/046952.
Restriction and/or Election Requirement mailed Jan. 20, 2011 in co-pending U.S. Appl. No. 12/430,562, now published as U.S. Publication No. US 2010/0270775.
Amendment and Response to Requirement of Election of Species filed Feb. 22, 2011 in co-pending U.S. Appl. No. 12/430,562, now published as U.S. Publication No. US 2010/0270775.
Office Action mailed Mar. 30, 2011 in co-pending U.S. Appl. No. 12/430,562, now published as U.S. Publication No. US 2010/0270775.
Office Action mailed Jan. 21, 2011 in co-pending U.S. Appl. No. 12/430,274, now published as U.S. Publication No. US 2010/0270779.
Office Action mailed Dec. 13, 2010 in co-pending U.S. Appl. No. 12/504,544, now published as U.S. Publication No. US 2011/0012327.
Notification of Transmittal of the International Search Report and the Written Opinion of the International Searching Authority mailed Feb. 18, 2011 in International Application No. PCT/US2010/061744.
Notification of Transmittal of the International Search Report and the Written Opinion of the International Searching Authority mailed Jan. 3, 2011 in International Application No. PCT/US2010/055197.
Office Action mailed Oct. 29, 2010 in co-pending U.S. Appl. No. 12/430,246, now published as U.S. Publication No. US 2010/0270782.
Restriction Requirement mailed Sep. 15, 2010 in co-pending U.S. Appl. No. 12/430,246.
Amendment and Response to Requirement for Election of Species filed Oct. 12, 2010 in co-pending U.S. Appl. No. 12/430,246.
Preliminary Amendment filed Aug. 31, 2009 in co-pending U.S. Appl. No. 12/504,544.
Preliminary Amendment filed Jul. 15, 2010 in co-pending U.S. Appl. No. 12/504,544.
Notification of Transmittal of the International Search Report and the Written Opinion of the International Searching Authority mailed Mar. 30, 2010 in International Application No. PCT/US2010/021343.
Notification of Transmittal of the International Search Report and the Written Opinion of the International Searching Authority mailed Sep. 23, 2010 in International Application No. PCT/US2010/042070.
Co-pending U.S. Appl. No. 12/430,562, titled Knee Airbag Assemblies Configured for Inflator Insertion and Inflator-Mediated Coupling to an Airbag Housing, filed Apr. 27, 2009.
Co-pending U.S. Appl. No. 12/430,274, titled Inflatable Knee Airbags and Internal Tethers Produced From Single Panels of Material, filed Apr. 27, 2009.
Co-pending U.S. Appl. No. 12/430,246, titled Inflatable Knee Airbags Assemblies With Bag Straps for Wrapping the Airbags and Optimizing Deployment, filed Apr. 27, 2009.
Co-pending U.S. Appl. No. 12/645,130, titled Inflatable Airbag Assembly With an Integral Cover, filed Dec. 22, 2009.
Co-pending U.S. Appl. No. 12/504,544, titled Inflatable Knee Airbag Having Two Chambers Separated by an Internal Tether, filed Jul. 16, 2009.
Co-pending U.S. Appl. No. 12/872,323, titled Covers for Inflatable Knee Airbag Housings, filed Aug. 31, 2010.
Co-pending U.S. Appl. No. 12/872,946, titled Inflatable Knee Airbag Assemblies With Articulating Housings, filed Aug. 31, 2010.
Non-Final Office Action mailed Mar. 12, 2012 in co-pending U.S. Appl. No. 12/872,323, now published as U.S. Publication No. US 2012/0049488.

* cited by examiner

LOW-MOUNT INFLATABLE KNEE AIRBAGS HAVING SERIAL CHAMBERS

TECHNICAL FIELD

The present disclosure relates generally to the field of automotive protective systems. More specifically, the present disclosure relates to inflatable knee airbag cushions with a plurality of inflatable chambers.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the rolled/folded state behind a cover. During a collision event, vehicle sensors trigger the activation of an inflator, which rapidly fills the airbag with inflation gas. Thus the airbag rapidly changes confirmations from the rolled/folded configuration to an expanded configuration.

Figure 1:
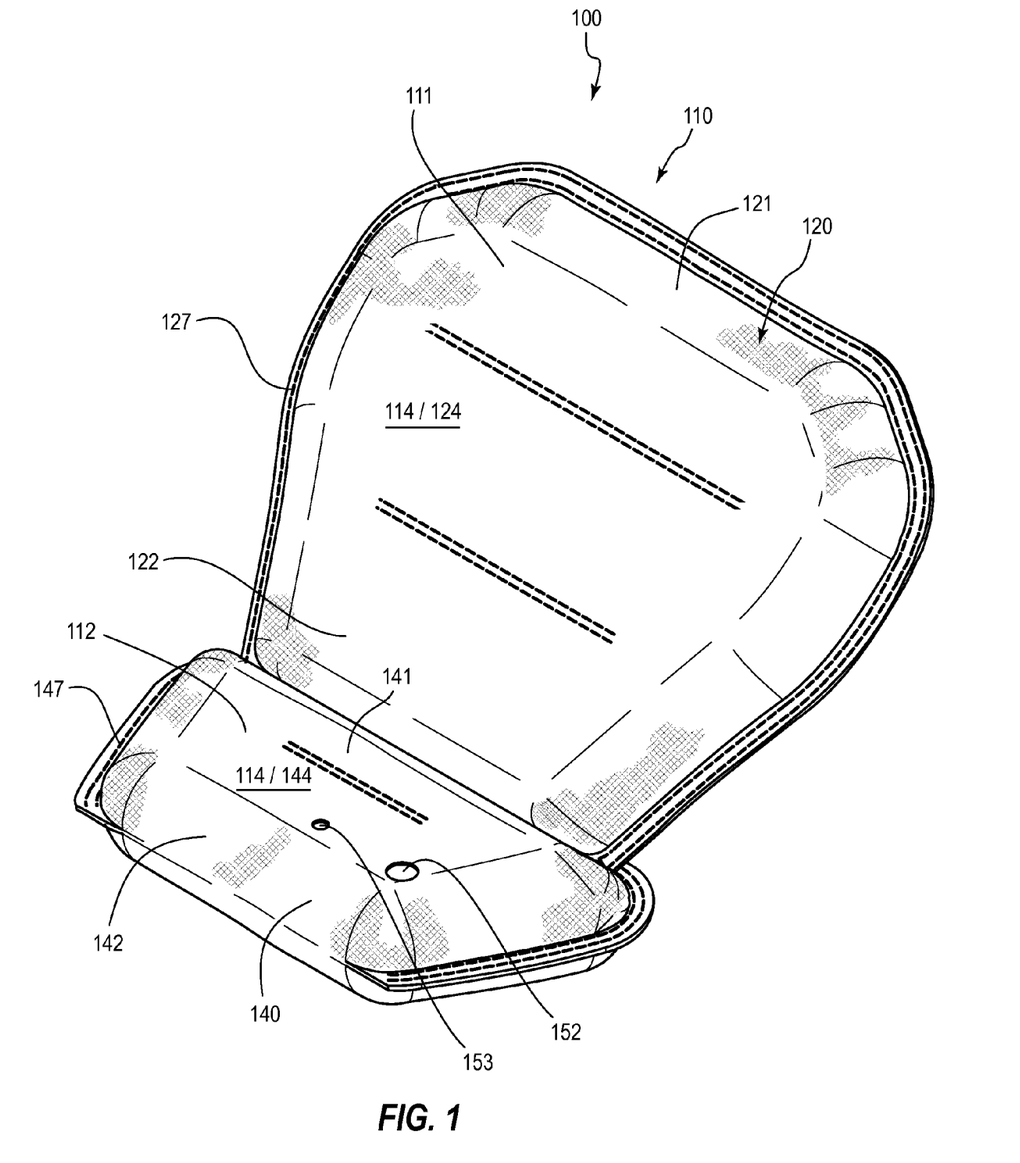
FIG. 1 is a rear perspective view of an inflatable knee airbag.

FIG. 1 is a rear perspective view of an inflatable knee airbag 110 having two or more chambers in a serial configuration. Inflatable knee airbag 110 may comprise a portion of an airbag assembly 100. Inflatable knee airbag 110 may comprise a first chamber 120 and a second chamber 140, wherein each of the first and second chambers comprise independent inflatable chambers that are attached together and are in fluid communication. In the present disclosure, "airbag 110" refers to an airbag that has two or more chambers coupled together in a substantially serial configuration.

Inflatable knee airbag 110 may be described as having an upper portion 111, a lower portion 112, a front face (not shown), and a rear face 114. Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

First chamber 120 has an upper portion 121, a lower portion 122, and is partially defined by a perimeter seam 127. Likewise second chamber 140 has an upper portion 141, a lower portion 142, and a perimeter seam 147. Further, second chamber 140 comprises apertures for coupling an inflator to airbag 110; inflator insert aperture 152 is configured to allow a tubular inflator to be inserted into second portion 140 of cushion 110 and inflator stem aperture 153 is configured to allow a mounting stem of an inflator to protrude through the aperture.

Figure 2:
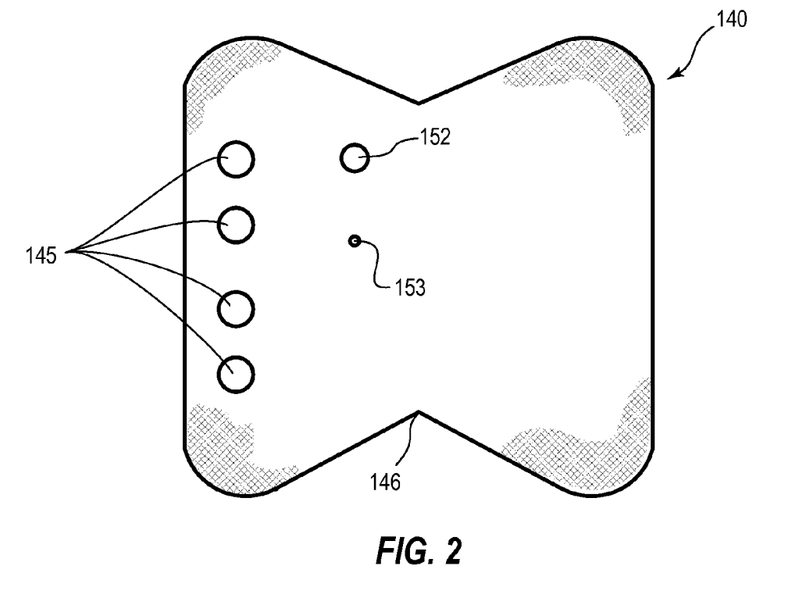
FIG. 2 is an elevation view of a panel of material from which a second chamber of the inflatable knee airbag of FIG. 1 can be formed.
Figure 3:
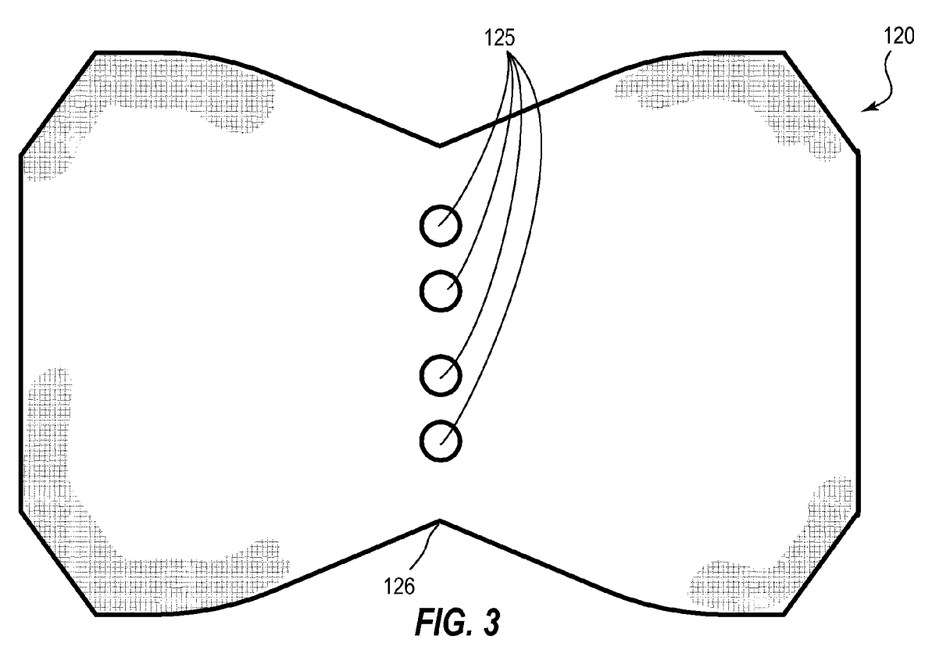
FIG. 3 is an elevation view of a panel of material from which a first chamber of the inflatable knee airbag of FIG. 1 can be formed.

FIGS. 2-3 are top elevation views of panels of material from which first and second chambers 120 and 140 may be formed. The shapes of the panels of materials as depicted in FIGS. 2-3 are for illustrative purposes only and may vary according to different embodiments. Generally, the panels of material may have a reduced width portion 126 and 146, which may form a point at which the panel of material can be folded. Once folded, the folded middle portion 146, may comprise a lower edge of the lower portion of the second chamber. The panels of material may comprise chamber to chamber vents 125 and 145, and the panel of material that can form second chamber 140 may comprise inflator apertures 152 and 153. The panels of material may comprise a woven nylon fabric that is well known in the art. In the depicted embodiment, inflator insert aperture 152 has a larger diameter than inflator stem aperture 153.

One skilled in the art will recognize that the first and second chambers need not necessarily be formed from single panels of material and that the apertures need not be formed in the materials from which the chambers will be formed prior to the chambers being assembled from the materials. Also, those skilled in the art will appreciate that a variety of types and configurations of airbag cushion membranes can be utilized without departing from the scope and spirit of the present disclosure. For example, the size, shape, and proportions of the cushion membrane may vary according to its use in different vehicles or different locations within a vehicle. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 4:
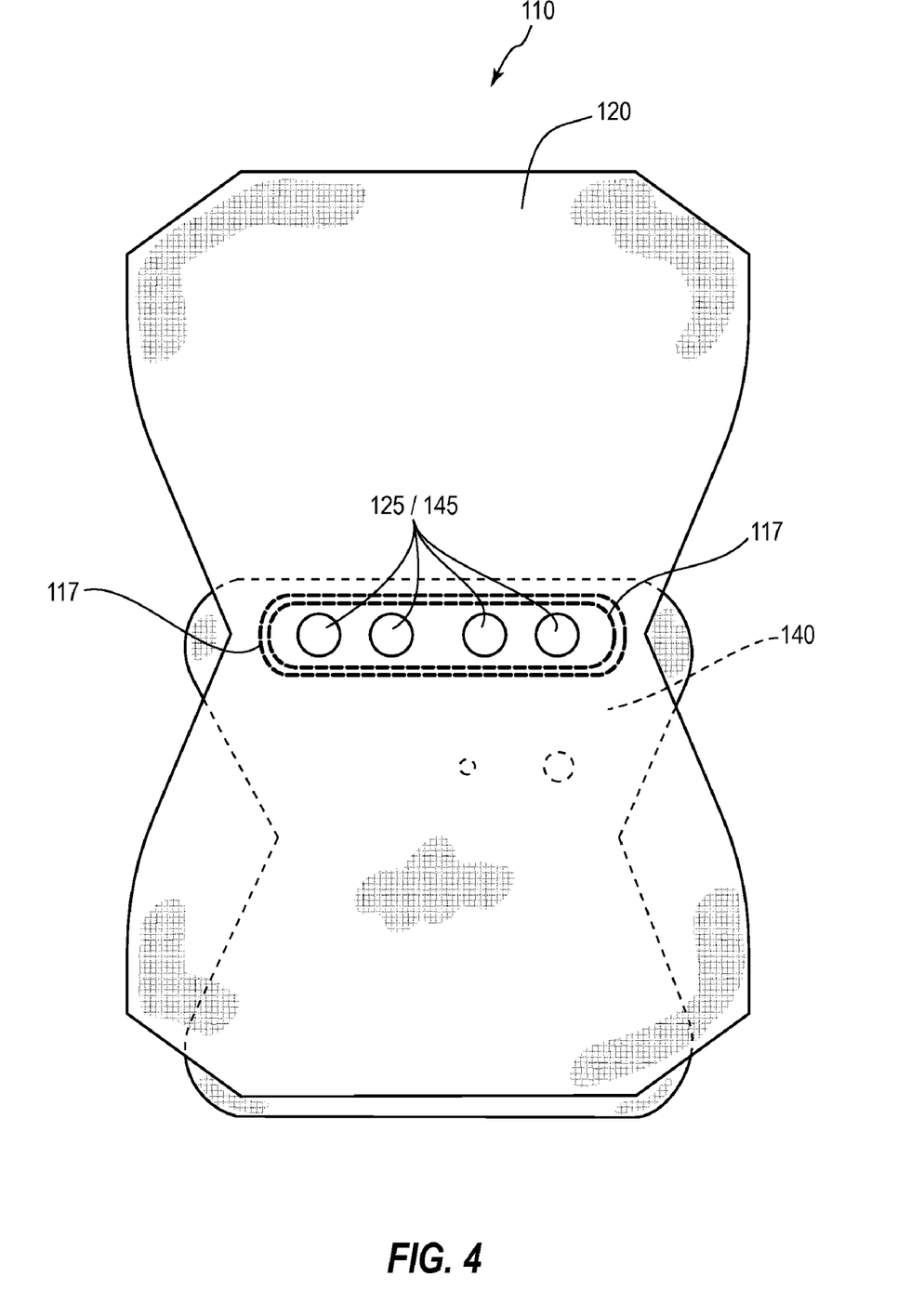
FIG. 4 is a front elevation view of the panels of material of FIGS. 2-3 after the panels of material have been coupled together.

FIG. 4 depicts the panels of material as depicted in FIGS. 2-3 after first chamber panel of material 120 has been placed on top of second chamber panel of material 140 and sewn together at stitching 117. The panels of material are oriented such that chamber to chamber vents 125/145 coincide.

Figure 5:
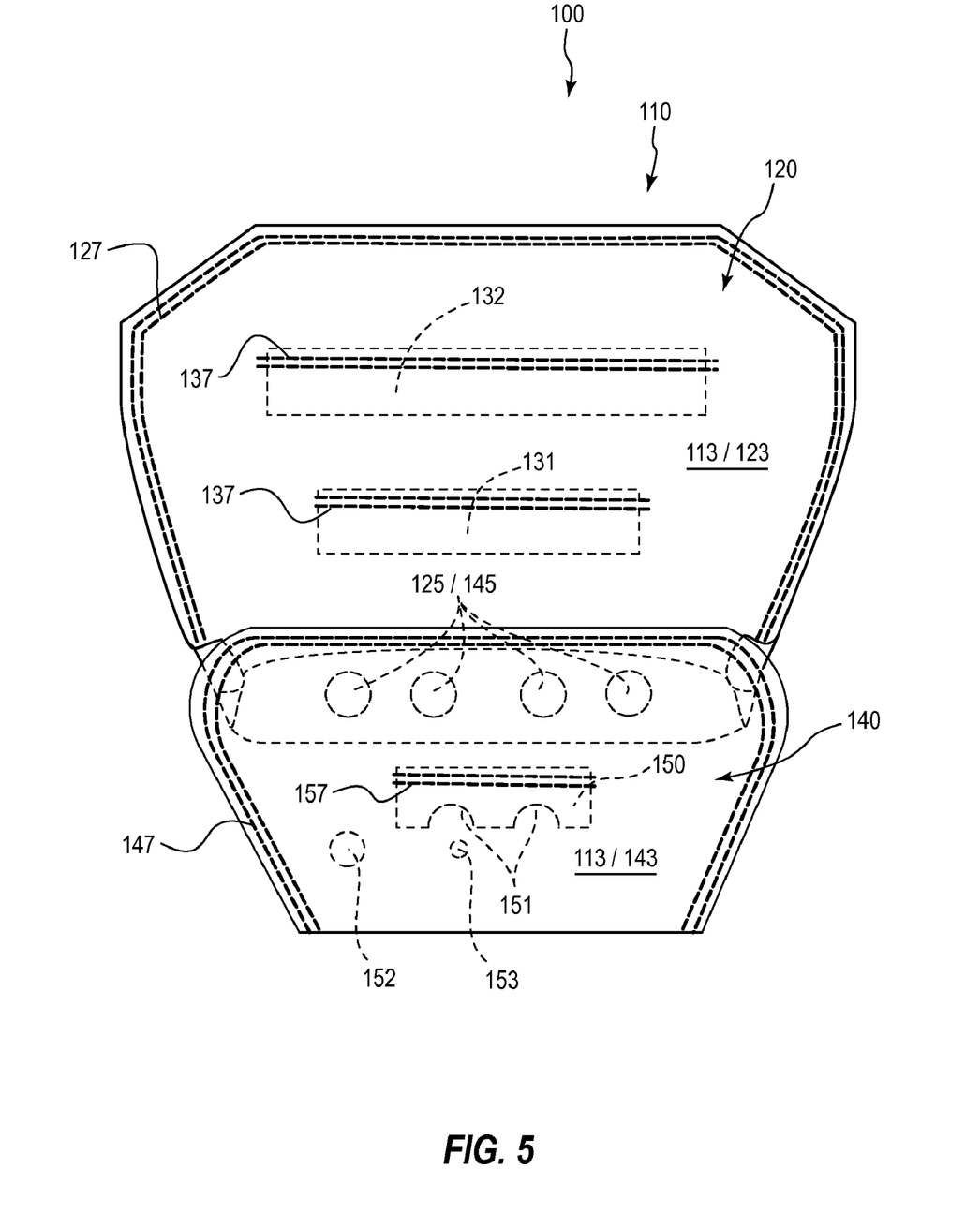
FIG. 5 is a front elevation view of the panels of material of FIG. 4 after the panels of material have each been folded and sewn to form the first and second chambers of the airbag of FIG. 1.
Figure 6:
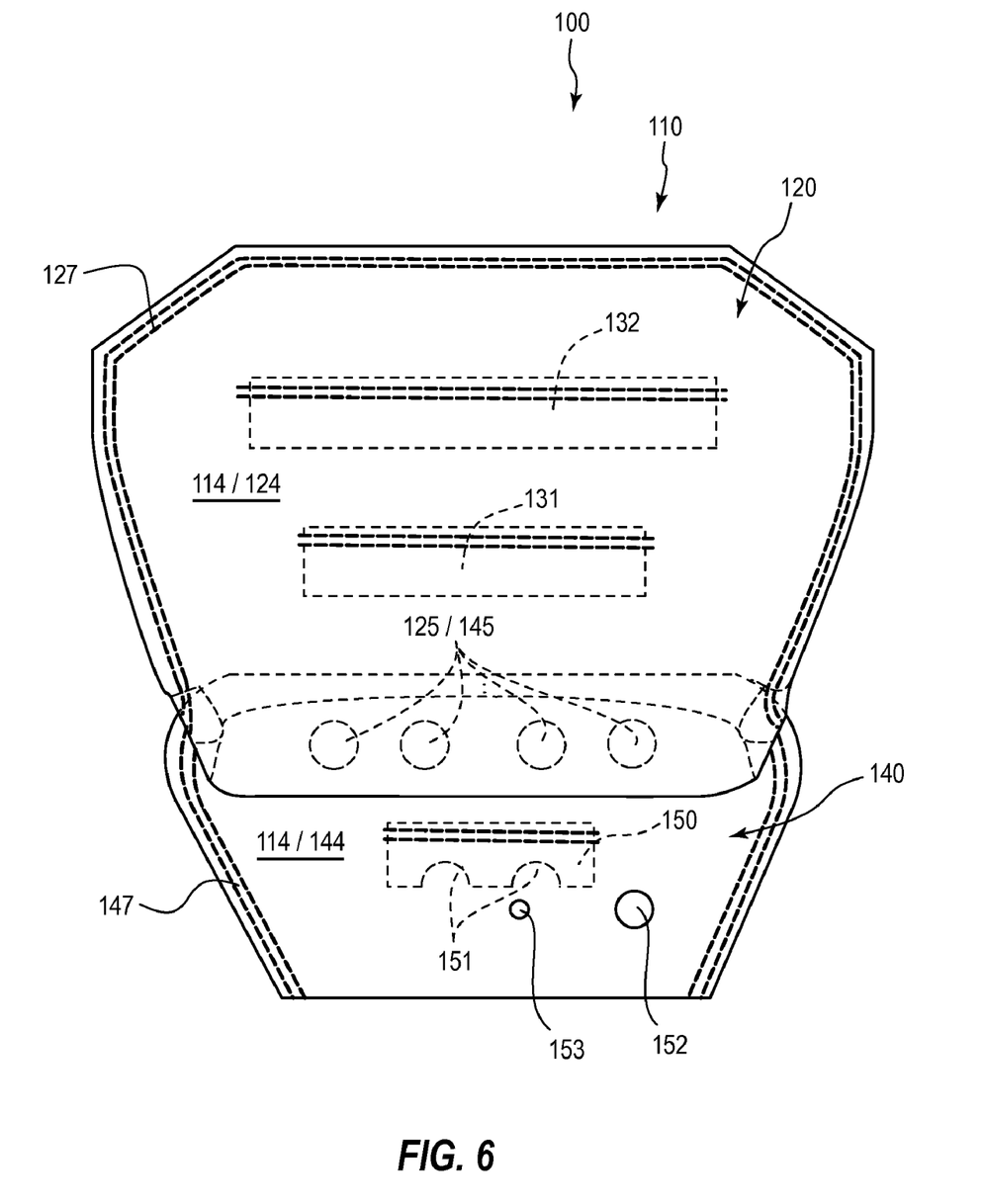
FIG. 6 is a rear elevation view of the panels of material of FIG. 5.

FIGS. 5-6 are front and rear elevation views, respectively, of inflatable knee airbag 110 after the panels of material that form the first and second chambers 120 and 140 have been folded and stitched around perimeter seams 127 and 147. FIGS. 5-6 may be said to depict airbag 110 in a flattened configuration, wherein the airbag is extended, but not inflated. FIG. 5 depicts front face 113 of inflatable knee airbag 110, which comprises front face 123 of first chamber 120 and front face 143 of second chamber 140. FIG. 6 depicts rear face 114 of inflatable knee airbag 110, which comprises rear face 124 of first chamber 120 and rear face 144 of second chamber 140.

First chamber 120 may comprise one or more internal tethers; in the depicted embodiment, the first chamber comprises a first internal tether 131 and a second internal tether 132, wherein each internal tether extends from front face 123 to rear face 124. Similarly, second chamber 140 may comprise one or more internal tethers; in the depicted embodiment, the second chamber comprises an internal tether 150 that may have a plurality of tether vent apertures 151, which are configured to allow inflation gas to flow through them. Second chamber 140 also has inflator apertures 152 and 153. Perimeters of each of the first and second chambers 120 and 140 are partially defined by perimeter seams 127 and 147. First and second chambers 120 and 140 are attached such that chamber to chamber vents 125 and 145 define an aperture through which inflation gas can flow from one chamber to another.

Figure 7:
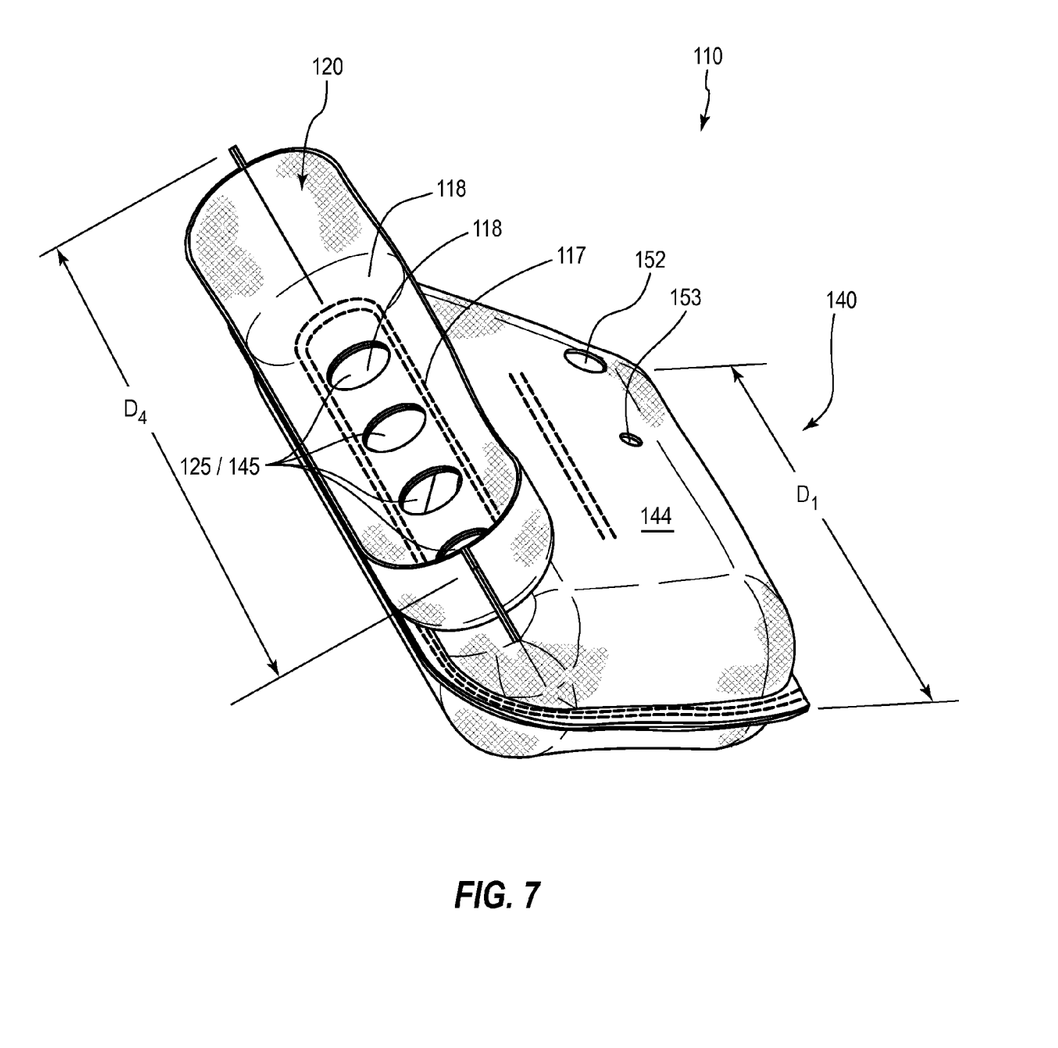
FIG. 7 is a cutaway perspective view of the inflatable knee airbag of FIG. 1.

FIG. 7 depicts a cutaway perspective view of inflatable knee airbag 110, wherein a portion of first chamber 120 has been cutaway. For clarity, inflatable knee airbag 110 is depicted in an inflated state. First and second chambers 120 and 140 each define an inflatable void 118, which may be considered to be a contiguous inflatable void extending into both chambers via chamber to chamber vents 125 and 145. First and second chambers are attached via stitching 117.

Inflator apertures 152 and 153 are visible on rear face 144 of second chamber 140. In another embodiment, the chamber to chamber vents may be configured as one-way or non-return valves such that inflation gas can pass from the second chamber to the first chamber, but not vice versa. In another embodiment, the first and/or second chamber may comprise one or more atmospheric vents that each allow inflation gas to pass from the inflatable void to outside the airbag.

Figure 8:
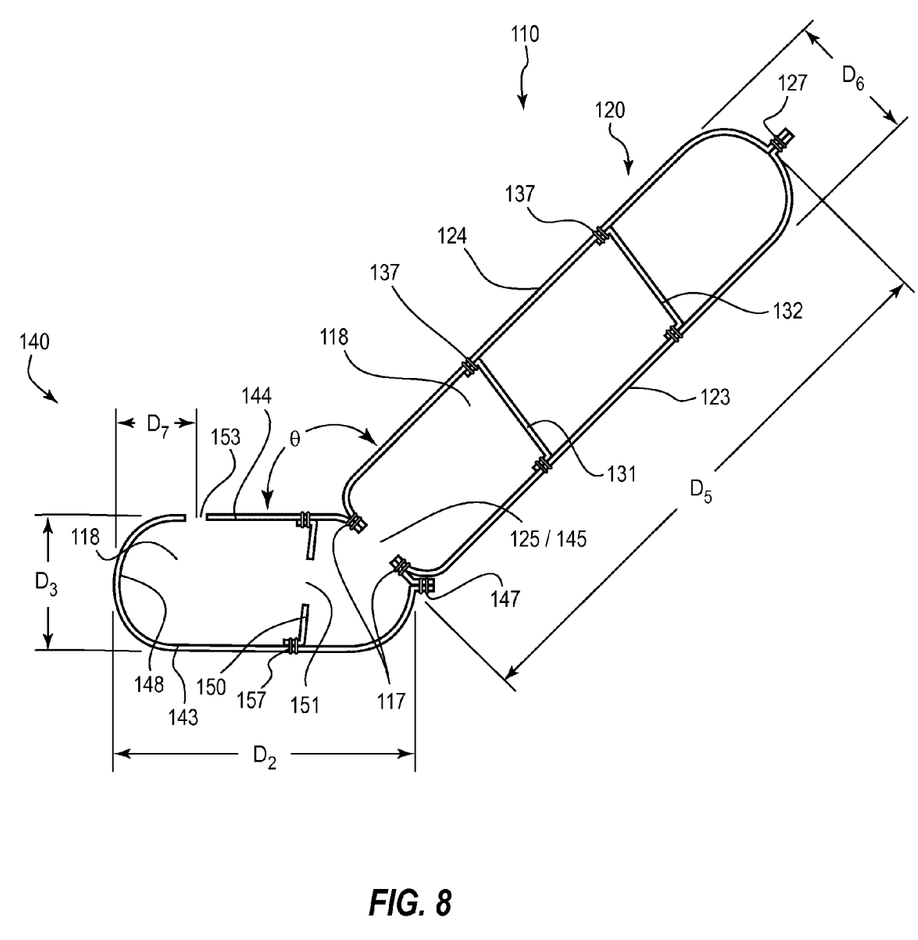
FIG. 8 is a cross-sectional view of the inflatable knee airbag of FIG. 1.

FIG. 8 is a cross-sectional view of inflatable knee airbag 110, which is depicted in a deployed/inflated configuration. An inflatable depth of first chamber and second chambers 120 and 140 is limited by internal tethers 131, 132, and 150. Internal tether 150 has a tether vent aperture 151. Second chamber 140 has inflator stem aperture 153 and the inflator insert aperture (not visible); the inflator apertures comprise centers that may be located between about 30% and about 60% of a distance between the lower edge of second chamber 140 and stitching 157 that couples internal tether 150 to the second chamber.

First and second chambers 120 and 140 are attached via stitching 117 such that chamber to chamber vents 125 and 145 are at least partially aligned, whereby inflatable void 118 may be said to extend into both chambers. First and second chambers 120 and 140 are coupled together on rear face 144 of the second chamber such that the upper portion of perimeter seam 147 is located on a passenger side of airbag 110. First and second chambers 120 and 140 are coupled together such that an angle is formed between rear face 124 and 144.

First and second chambers 120 and 140 are coupled together on rear face 144 of second chamber 140 in a configuration that determines the angle between first and second chambers 120 and 140 when they are inflated. For example, the angle is shown in FIG. 8 as being greater than 90° such as about 120°. In some embodiments, the angle may be between about 90° and about 160°. In the embodiment depicted in FIG. 8, the location of seams 117 and 147 assists in maintaining the desired angle. In some embodiments, a length $D_1$ (FIG. 7) of the second chamber can be from about 150 mm to about 250 mm; a width $D_2$ can be from about 200 mm to about 500 mm; and an inflatable depth $D_3$ can be from about 50 mm to about 150 mm. In some embodiments, a length $D_4$ (FIG. 7) of the first chamber can be from about 250 mm to about 500 mm; a width $D_5$ can be from about 350 mm to about 700 mm; and an inflatable depth $D_6$ can be from about 50 mm to about 200 mm. A distance $D_7$ from a distal end 148 of second chamber 140 to a center of the inflator apertures 153 and 152 (depicted in FIG. 7) can be from about 25 mm to about 125 mm. The inflator apertures may be placed at any position along the width of the second chamber.

FIGS. 9A-9D depict a deployment sequence and deployment trajectory of inflatable knee airbag 110, which is positioned at a bottom portion 14 of an instrument panel 12 in a vehicle 10. Instrument panel 12 has a front face 16, which is located on an occupant side of the instrument panel. Airbag assembly 100 may be coupled to instrument panel 12 via an inflator 160. Airbag assembly 100 may be said to be mounted "under" instrument panel 12 and airbag 110 may be said to comprise a "bottom deploying" airbag. Airbag assembly 100 may further comprise a housing into which airbag 110 can be packaged. Inflator 160 is in fluid communication with inflatable void 118 of airbag 110 at bottom portion 112.

Figure 9A:
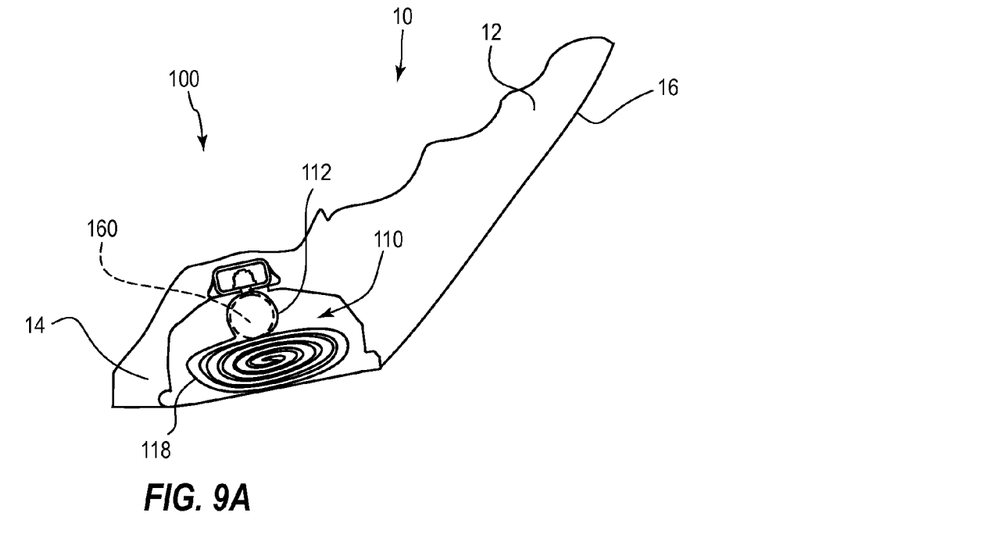
FIG. 9A is a side elevation view of the inflatable knee airbag of FIG. 1 after it has been mounted in a vehicle, but before it has been deployed.
Figure 9B:
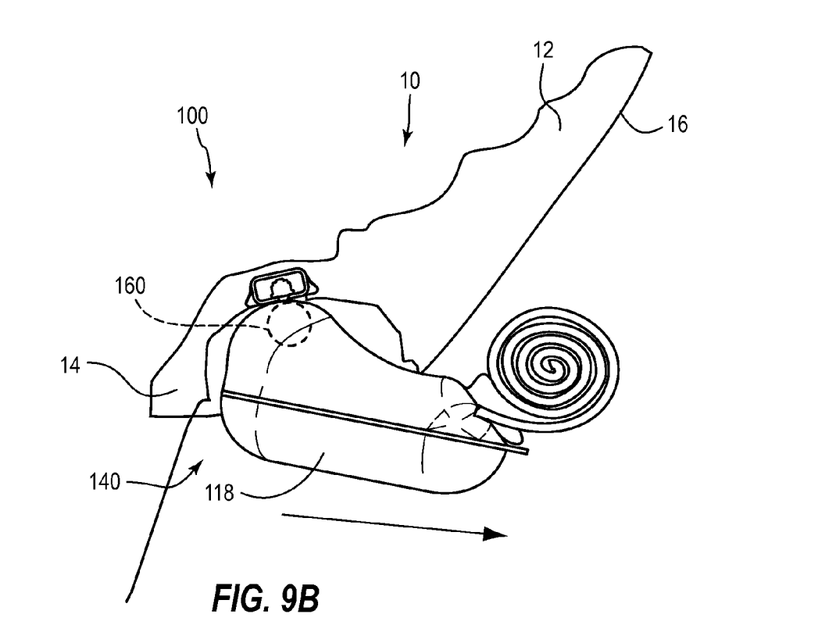
FIG. 9B is a side elevation view of the inflatable knee airbag of FIG. 9A during early airbag deployment.

FIG. 9A depicts inflatable knee airbag 110 before inflator 160 has been activated and before the airbag has been deployed. Inflatable knee airbag 110 may be called a "bottom deploying" airbag; as such, when airbag 110 is initially deployed, it travels downward in a direction of a vehicle floorboard. FIG. 9B depicts airbag 110 early in deployment, wherein inflator 160 has been activated and has at least partially inflated inflatable void 118 of second chamber 140. The primary direction of travel of second chamber 140 may be said to be horizontal, relative to the vehicle floorboard, and toward or into a cabin of the vehicle in a direction of the occupant.

Figure 9C:
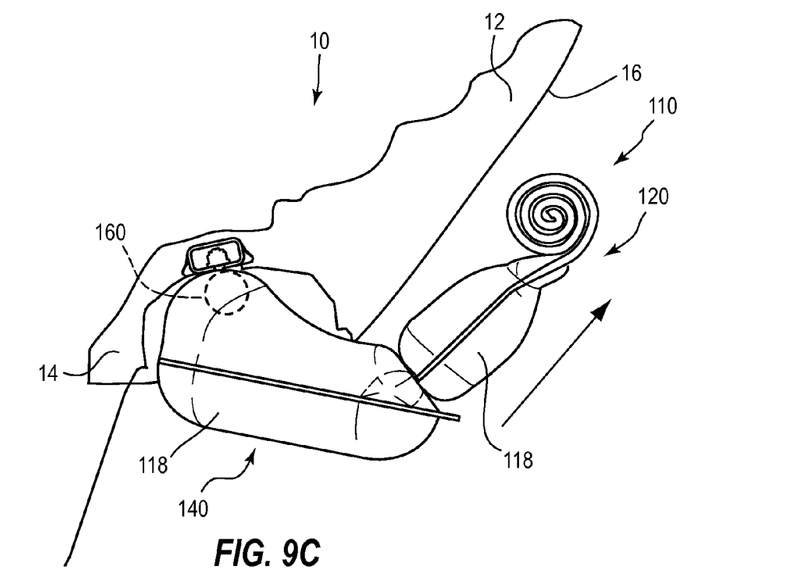
FIG. 9C is a side elevation view of the inflatable knee airbag of FIG. 9B during mid-airbag deployment.

FIG. 9C depicts inflatable knee airbag 110 in a mid-deployment configuration, wherein second chamber 140 has been at least partially inflated as depicted in FIG. 9B, and first chamber 120 is partially inflated. Inflatable knee airbag 110 is configured such that first chamber 120 deploys close to front face 16 of instrument panel 12. A length of second chamber 140 may be altered to change how closely to instrument panel 12 first chamber 120 deploys. First chamber 120 may be said to deploy in a direction that is substantially parallel with front face 16 of instrument panel 12. For clarity, FIGS. 9B-9C depict second chamber 140 as being fully inflated before first chamber 120 begins to be inflated as in FIG. 9B and before first chamber is fully inflated as in FIG. 9C. In some embodiments, the second chamber may only partially inflate when the first chamber begins to inflate. In some embodiments, the second chamber may fully inflate before the first chamber fully inflates. In other embodiments, the second chamber and the first chamber may become fully inflated at the same time.

Figure 9D:
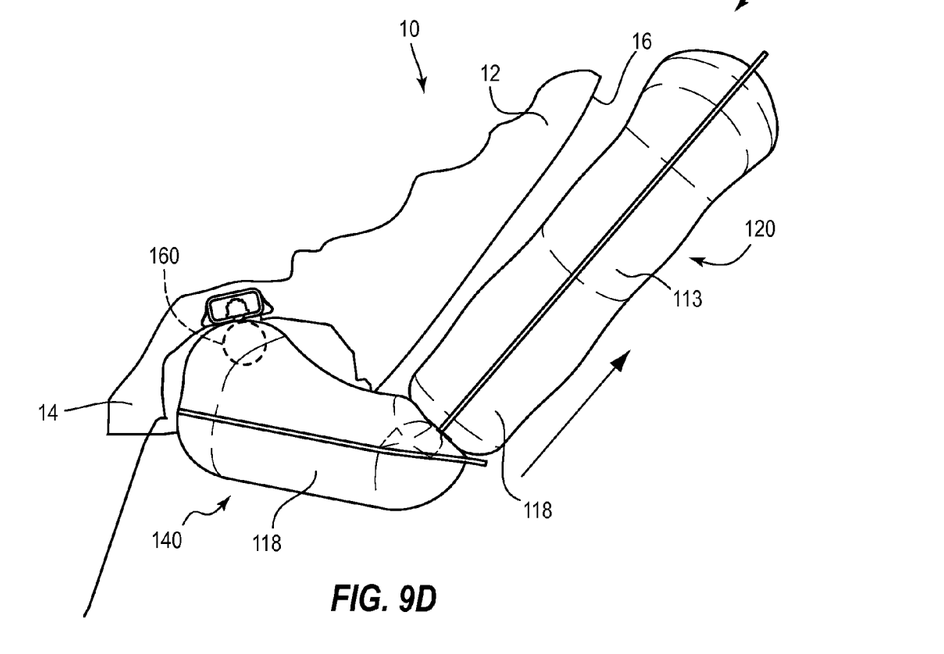
FIG. 9D is a side elevation view of the inflatable knee airbag of FIG. 9C during late airbag deployment.

FIG. 9D depicts inflatable airbag 110 after inflatable void 118 of the first and second chambers 120 and 140 have become fully inflated. Front face 113 of airbag 110 is in position to cushion the knees and lower legs of an occupant. An angle formed between first chamber 120 and second chamber 140 is similar to the angle formed by the bottom portion 14 and front face 15 of instrument panel 12.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An inflatable knee airbag configured to be mounted in a vehicle at a bottom portion of an instrument panel, wherein the inflatable knee airbag comprises:
a first inflatable chamber; and
a second inflatable chamber fluidly coupled to the first inflatable chamber in a serial configuration, such that during inflatable knee airbag deployment, the second inflatable chamber is at least partially inflated before the first inflatable chamber,
wherein a lower portion of the first inflatable chamber is attached to the second inflatable chamber at an upper portion of a rear face of the second inflatable chamber,
wherein each of the first and second inflatable chambers comprise single panels of material,
wherein the lower portion of the first inflatable chamber comprises a folded middle portion of the single panel of material from which the first inflatable chamber is formed,
wherein in the deployed configuration, the first inflatable chamber is located above the second inflatable chamber, and
wherein in the deployed configuration, an angle between a rear face of the first inflatable chamber and the rear face of the second inflatable chamber is greater than 90°.

2. The inflatable knee airbag of claim 1, wherein a perimeter seam of the second inflatable chamber is located on a front face of the inflatable knee airbag.

3. The inflatable knee airbag of claim 1, wherein the second inflatable chamber comprises a plurality of inflator apertures that are located on the rear face of the second inflatable chamber.

4. An inflatable knee airbag configured to be mounted in a vehicle at a bottom portion of an instrument panel, wherein the inflatable knee airbag comprises:
a first inflatable chamber; and
a second inflatable chamber fluidly coupled to the first inflatable chamber in a serial configuration, such that during inflatable knee airbag deployment, the second inflatable chamber is at least partially inflated before the first inflatable chamber,
wherein the second inflatable chamber comprises a front face and a rear face, wherein the front face and the rear face are opposite from each other,
wherein the second inflatable chamber comprises an inflator insert aperture and an inflator stem aperture that are each located on the rear face of the second inflatable chamber,
wherein a lower portion of the first inflatable chamber is attached to the second inflatable chamber at only an upper portion of the rear face of the second inflatable chamber,
wherein in the deployed configuration, the first inflatable chamber is located above the second inflatable chamber,
wherein in the deployed configuration, an angle between a rear face of the first inflatable chamber and the rear face of the second inflatable chamber is greater than 90° as determined by the attachment of the first inflatable chamber and the second inflatable chamber,
wherein the upper portion of the second inflatable chamber and the lower portion of the first inflatable chamber each comprise a plurality of chamber-to-chamber vents,
wherein the first and second inflatable chambers are attached such that each chamber-to-chamber vent of the second inflatable chamber aligns with a chamber-to-chamber vent of the first inflatable chamber,
wherein stitching attaches the first inflatable chamber and the second inflatable chamber together, and
wherein the stitching extends around the plurality of chamber-to-chamber vents.

5. The inflatable knee airbag of claim 4, wherein the inflator insert aperture has a greater diameter than the inflator stem aperture.

6. The inflatable knee airbag of claim 4, wherein the inflator insert aperture is located between about 25 mm and about 125 mm from a distal edge of the second inflatable chamber when the airbag is in a flattened configuration and the inflator stem aperture is located between about 25 mm and about 125 mm from a distal edge of the second inflatable chamber when the airbag is in a flattened configuration.

7. The inflatable knee airbag of claim 4, wherein the second inflatable chamber comprises an internal tether that is oriented such that it extends across a portion of the second inflatable chamber along an axis that is substantially parallel with a lower edge of the second inflatable chamber.

8. The inflatable knee airbag of claim 7, wherein the internal tether extends from a front face to the rear face of the second inflatable chamber, and wherein the internal tether comprises an aperture that allows inflation gas to flow from one side of the tether to another side of the tether.

9. The inflatable knee airbag of claim 8, wherein centers of the inflator insert and inflator stem apertures are located between about 30% and about 60% of a distance between the lower edge of the second inflatable chamber and stitching that couples the internal tether to the second inflatable chamber.

10. The inflatable knee airbag of claim 9, wherein the first inflatable chamber comprises an internal tether that extends across a portion of the first inflatable chamber along an axis that is substantially parallel with a lower edge of the first inflatable chamber, and wherein the internal tether extends from a front face to a rear face of the first inflatable chamber.

11. The inflatable knee airbag of claim 4, wherein the location of the stitching and the location of the perimeter seam of the second inflatable chamber relative to each other assist in determining the angle between the rear face of the first inflatable chamber and the rear face of the second inflatable chamber.

12. The inflatable knee airbag of claim 4, wherein each of the first and second inflatable chambers comprise single panels of material.

13. The inflatable knee airbag of claim 12, wherein the lower portion of the first inflatable chamber comprises a folded middle portion of the single panel of material from which the first inflatable chamber is formed.

14. The inflatable knee airbag of claim 4, wherein in the deployed configuration, the angle between the rear face of the first inflatable chamber and the rear face of the second inflatable chamber is greater than 90° and up to about 160° as determined by the attachment of the first inflatable chamber and the second inflatable chamber.

* * * * *